(12) United States Patent
Holscher

(10) Patent No.: US 6,895,495 B1
(45) Date of Patent: May 17, 2005

(54) NEXT AVAILABLE BUFFER ALLOCATION CIRCUIT

(75) Inventor: Brian K. Holscher, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 09/607,783

(22) Filed: Jun. 30, 2000

(51) Int. Cl.$^7$ .............................................. G06F 15/00
(52) U.S. Cl. ...................................... 712/200; 712/220
(58) Field of Search ................................. 712/200, 220

(56) References Cited

U.S. PATENT DOCUMENTS

| | | | |
|---|---|---|---|
| 4,510,581 A | * | 4/1985 | Cohen .......................... 711/119 |
| 4,991,172 A | * | 2/1991 | Cidon et al. .................. 370/400 |
| 6,219,773 B1 | * | 4/2001 | Garibay et al. .............. 711/201 |

OTHER PUBLICATIONS

Wakerly, John F., Digital Design, Priciples and Practices, 2000, Prentice Hall, Third Edition, pp. 538–539, 542–543.*

* cited by examiner

Primary Examiner—Eddie Chan
Assistant Examiner—Charles Harkness
(74) Attorney, Agent, or Firm—Blakely, Sokoloff, Taylor & Zafman LLP

(57) ABSTRACT

An apparatus and method for selecting a next available buffer from among an array of buffers using a reduced count of logic gates. The apparatus includes an array of computational cells coupled to one another in a cascaded fashion, wherein each computational cell corresponds to a respective buffer in the array of buffers. The array of computational cells includes a first set of inputs for receiving data in accord with an availability vector comprising 1 bit for each buffer that identifies which buffers are available for allocation. A second set of inputs in accord with a current selected entry vector is also provided, wherein the current selected entry vector includes a single asserted bit that identifies that last buffer to be allocated. A computational cell includes logic to implement a pair of predefined logic equations, whereby a next available vector in accord with a first set of outputs on the array of computational cells. The next available vector comprises a single asserted bit that identifies a next available buffer to be allocated for use by apparatus, such as microprocessors, in which the invention is implemented.

16 Claims, 3 Drawing Sheets

NEXT AVAILABLE BUFFER ALLOCATION CIRCUIT

BACKGROUND OF THE INVENTION

1. Field of the Invention

The present invention generally concerns buffer allocation in processing devices, and in particular concerns allocation of a next available buffer in a microprocessor.

2. Background Information

A common approach in trying to find the next available buffer in a processing device is to implement priority encoders, which determine the next available buffer through use of a pointer to the current buffer and a bit vector representing the combination of available buffers. For each pointer position, a priority encoder determines the next buffer from the available buffer bit vector. For example, if 8 buffers were to be implemented in this manner, 8 priority encoders would typically be used. The output of all the encoders is then driven to a multiplexer (mux), which uses the pointer to the current buffer to pick which encoder's output to use. Each encoder is for a different pointer value, and accordingly, cannot be shared by other pointer values.

The following truth tables correspond to an exemplary 3-buffer configuration that employs priority encoders.

| Input | Output |
|---|---|
| Encoder 0: | |
| 000 | 000 |
| 001 | 001 |
| 010 | 010 |
| 011 | 010 |
| 100 | 100 |
| 101 | 100 |
| 110 | 010 |
| 111 | 010 |
| Encoder 1: | |
| 000 | 000 |
| 001 | 001 |
| 010 | 010 |
| 011 | 001 |
| 100 | 100 |
| 101 | 100 |
| 110 | 100 |
| 111 | 100 |
| Encoder 2: | |
| 000 | 000 |
| 001 | 001 |
| 010 | 010 |
| 011 | 001 |
| 100 | 100 |
| 101 | 001 |
| 110 | 010 |
| 111 | 001 |
| Output Mux | |
| (Input is current pointer and guaranteed to have one and only one bit set): | |
| 001 | Encoder0 |
| 010 | Encoder1 |
| 100 | Encoder2 |

As the number of buffers increase, the number of input and output bits for each encoder also increases. Furthermore, this requires an increase in the size of the mux, as well. As a result, there is an almost exponential growth in the required logic as the number of buffers increase. Accordingly, an improved approach is desired.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

The present invention comprises circuitry that enables selection of the next available entry in an array of buffers based on an available vector and a current selected entry vector. In general, buffers within an array of some quantity of buffers are desired to be accessed by devices such as microprocessors for temporary storage of data. The actual quantity of buffers that may be accessed through implementation of the present invention, as described below, is not limited. For convenience, the quantity of buffers will be denoted as b buffers, since the invention is extendible to any value of b>1 buffers.

Figure 1:
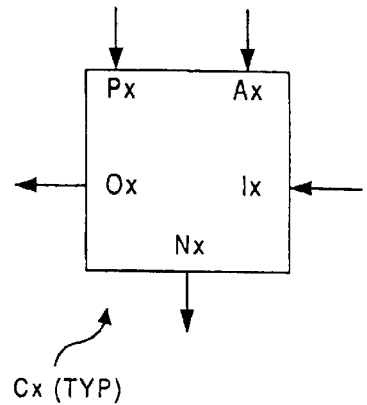
FIG. 1 is a block diagram illustrating the inputs and outputs of a computational cell implemented by the present invention.
Figure 2:
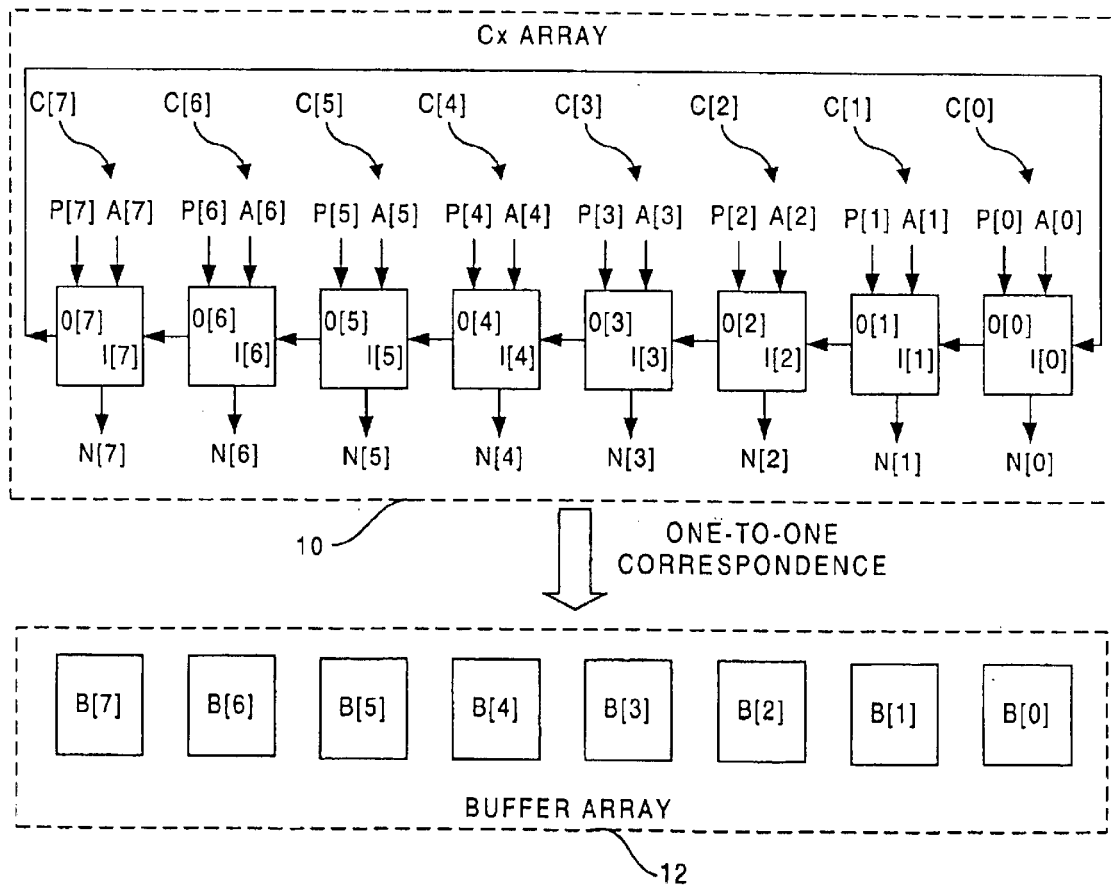
FIG. 2 is a block schematic diagram illustrating a cascaded array of computational cells in accord with an exemplary embodiment of the invention.

In one embodiment, the circuitry comprises a quantity of computational cells that are organized such that there is a one-to-one correspondence to respective buffers among the quantity of buffers that are desired to be accessed (i.e., the quantity of computational cells is equal to the quantify of buffers (=b)). With reference to FIGS. 1–4, each computational cell is denoted by Cx, wherein x is in the range of 0 to b−1. As shown in FIG. 1, each computational cell Cx has 3 inputs, denoted Ax, Px, and Ix, and two outputs, denoted Ox and Nx, and includes combinational logic to calculate each of the 2 outputs and 3 inputs. FIG. 2 illustrates an exemplary buffer allocation circuit 10 comprising an array of 8 computational cells Cx coupled together in a cascaded fashion, wherein each computation cell receives input data and provides output data corresponding to a respective buffer Bx (i.e., B[0], B[1], etc.), in a buffer array 12.

The inputs Ax, Px, and Ix to the array of computational cells are defined as follows. The Ax inputs collectively define an availability vector consisting of 1 bit for each buffer (i.e., 1 bit for each computational cell Cx). Each bit is asserted (i.e., 1) when a buffer is available for use and de-asserted (i.e., 0) if the buffer is being used. Each bit of the availability vector is connected to a corresponding Ax input. The Px inputs collectively define a current selected entry vector consisting of 1 bit for each buffer. One bit is asserted at a time in the selected entry vector, indicating which entry or buffer was the last to be selected. Each bit of this selected entry vector is connected to a corresponding Px input. As shown in FIG. 2, The Ix inputs are connected to a respective Ox output from a preceding (i.e., adjacent) cell. For example, the I(1) input is connected to the O(0) output, the I(2) input is connected to the O(1) output, etc. In addition, the I(0) input is connected to the O(b−1) output.

Outputs Ox and Nx from the array of computational cells are as follows. The Nx outputs form a next availability vector consisting of 1 bit from each computational cell, wherein each bit is connected to a corresponding Nx output. Only 1 bit is asserted at any one time, wherein the asserted bit represents the next selected entry. The Ox outputs are connected to the Ix inputs of the next cell (i.e., the cell to the immediate left), and comprise logic values based on the equations defined below.

Each computational cell Cx includes logic to implement the following logic equations:

$$N = A \text{ AND } I \quad (1)$$

$$O = P \text{ OR } (\text{NOT } A \text{ AND } I) \quad (2)$$

Figure 3:
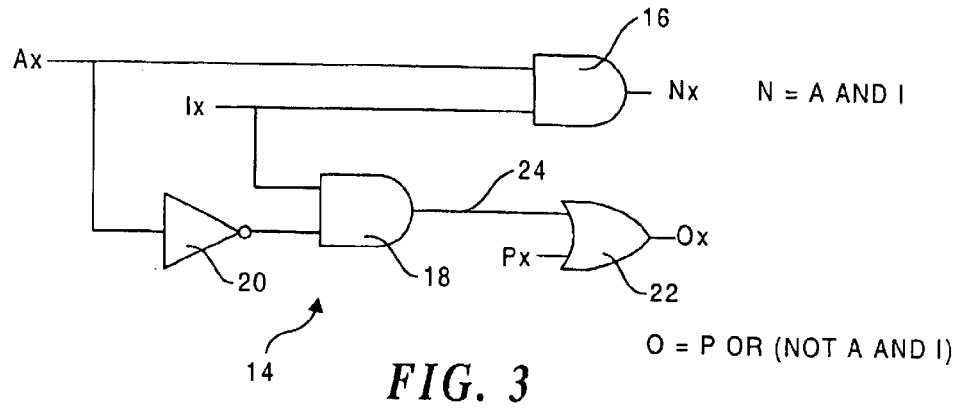
FIG. 3 is a detailed schematic diagram illustrating a set of logic gates employed in a exemplary embodiment of the computational cell.

An exemplary logic circuit 14 for implementing the foregoing logic equations is shown in FIG. 3, and includes a pair of AND gates 16 and 18, an inverter 20, and an OR gate 22. AND gate 16 produces an Nx output by logically ANDING Ax and Ix inputs. AND gate 18 produces an output 24 by logically ANDING the Ix input and an inverted Ax input, which is inverted by inverter 20. Output 24 of AND gate 18 is then logically OR'ed with input Px (by OR gate 22) to produce output Ox. As will be recognized by those skilled in the art, other logic circuit components may be implemented to produce similar outputs in accord with equations (1) and (2).

Figure 4:
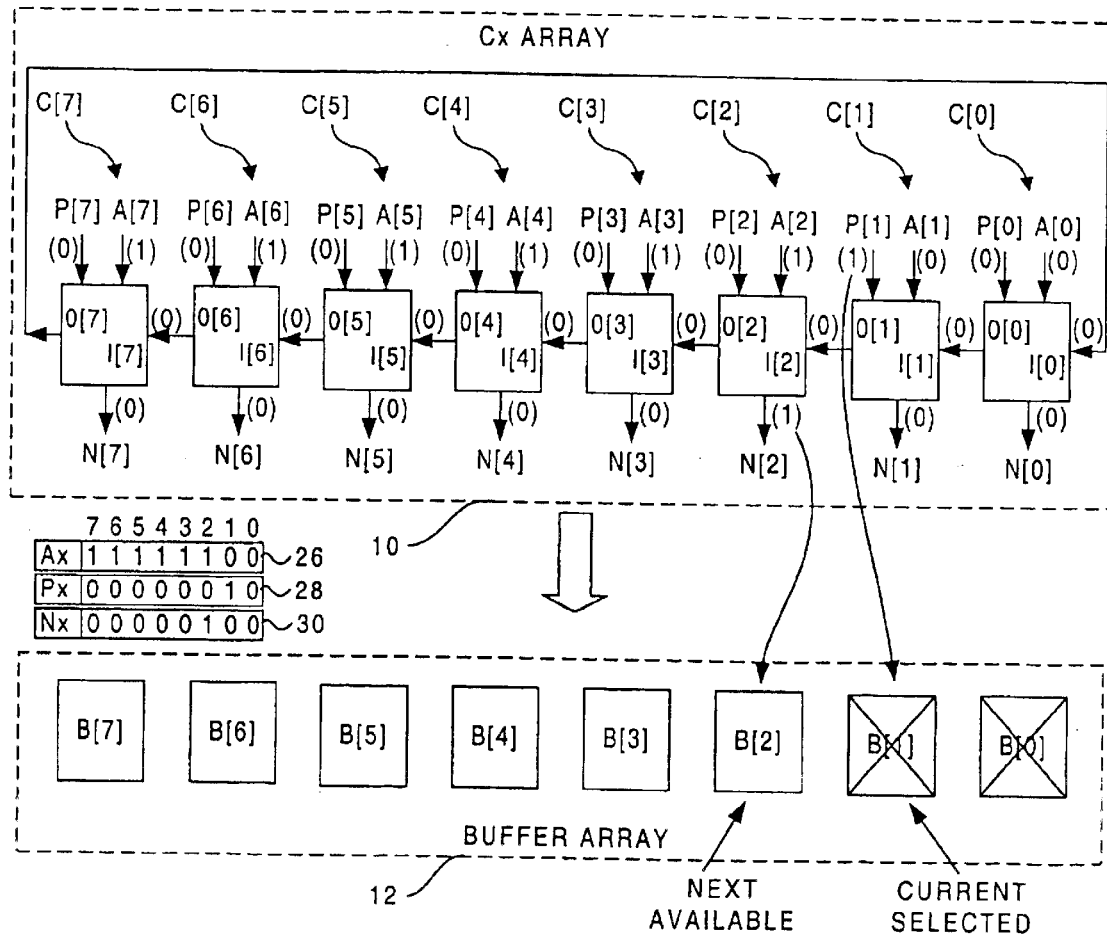
FIG. 4 is a block schematic diagram in accord with FIG. 2 illustrating the logic values at each of the inputs and outputs of the logic circuits in the array of computational cells under a predefined starting condition.

With reference to FIG. 4, an exemplary data configuration corresponding to a current usage of buffers B[0]–B[7] in buffer array 12 is illustrated, wherein buffers B[0] and B[1] are in current use, and buffer B[1] is the current selected buffer. Accordingly, the Ax data is defined by an available vector 26 with a value of [11111100], indicating that buffers B[0] and B[1] are currently in use, while buffers B[2]–B[7] are available. Furthermore, the Px data collectively comprises a current selected entry vector 28 with a value of [00000010], indicating that buffer B[1] is the currently selected buffer, and the Nx data collectively comprise a next available vector 30 with a value of [00000100], indicating that the next available buffer is B[2]. Once buffer B[2] is allocated for use, the value of available vector 26 will change to [11111000], the value of selected entry vector 28 will change to [00000100], and the value of next available vector 30 will change to [00001000], indicating the buffer B[3] is the next available buffer.

Figure 5:
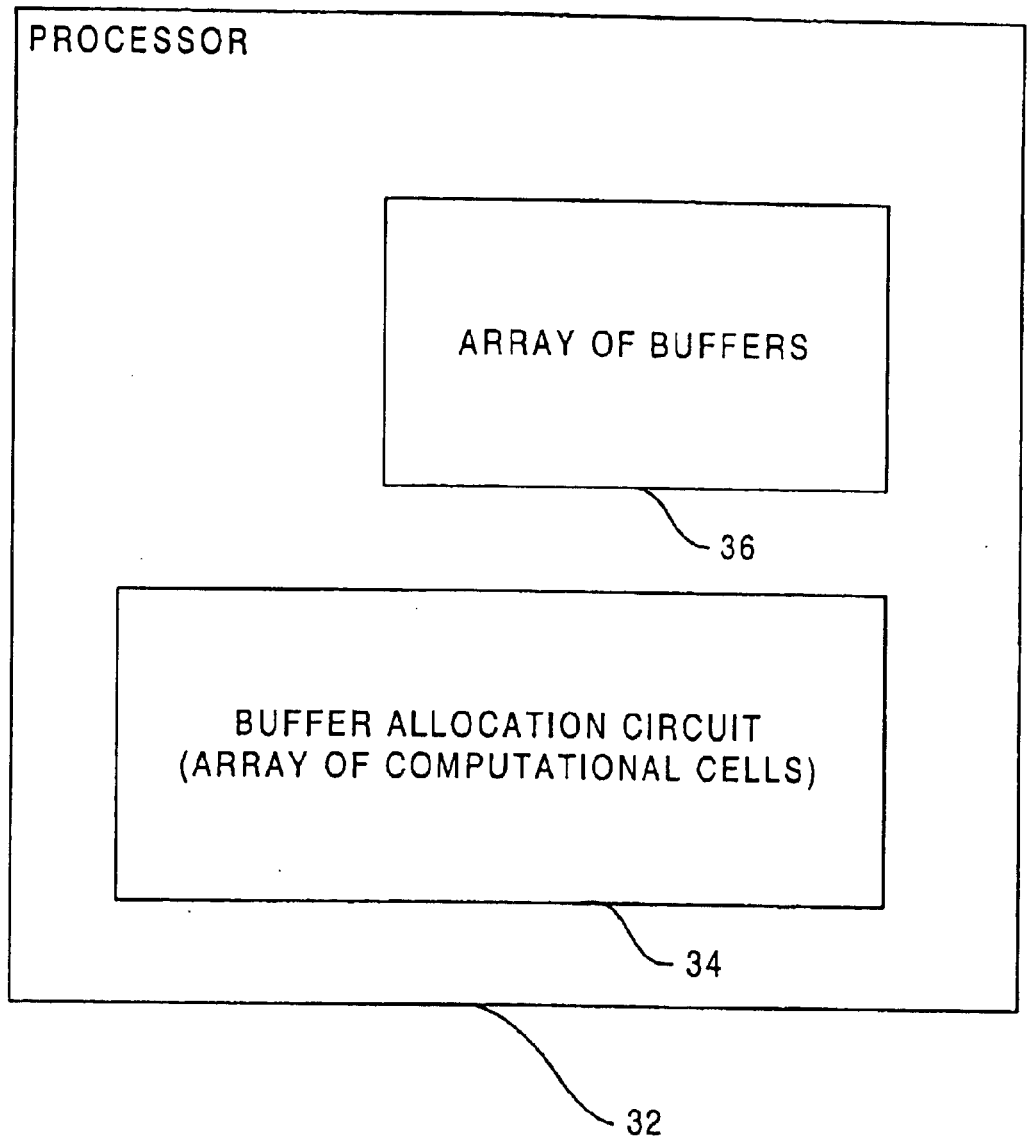
FIG. 5 is a block schematic diagram of a processor that includes an array of buffers that are allocated through use of the array of computational cells an accord with the present invention.

The present invention may be implemented in various logic devices, such as a processor 32 shown in FIG. 5. Processor 32 includes a buffer allocation circuit 34 that is substantially similar to buffer allocation circuit 10, which is used to allocate buffers from among an array of buffers 36. In addition, processor 32 includes typically processing circuitry, such as functional units, cache, etc., (all not shown).

The above description of illustrated embodiments of the invention is not intended to be exhaustive or to limit the invention to the precise forms, disclosed. While specific embodiments of, and examples for, the invention are described herein for illustrative purposes, various equivalent modifications are possible within the scope of the invention, as those skilled in the relevant art will recognize.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference tot he claims that follow.

What is claimed is:

1. Apparatus comprising:
   an array of computational cells coupled to one another and having a one-to-one correspondence with respective buffers of an array of buffers, wherein each computational cell includes:
      a first input for receiving data corresponding to an availability status of the respective buffer corresponding to the computational cell;
      a second input for receiving data corresponding to a currently selected buffer from among the array of buffers;
      a first output upon which data is produced for identifying a next available buffer;
      a third input; and
      a second output coupled to the, third input of a next computational cell, wherein the first output is coupled to logically AND the first input with the third input,
   wherein the data produced on the first outputs of the computational cells collectively comprise a next available buffer vector that identifies a next buffer in the buffer array to be allocated.

2. The apparatus of claim 1, wherein data is produced on the second output of a given computational cell as a function of data received at the first, second, and third inputs for the computational cell.

3. The apparatus of claim 2, wherein each computational cell comprises:
   an inverter for receiving data on the first input of the cell and having an output;
   a first AND gate having a first input coupled to the output of the inverter; and a second input for receiving data on the third input of the cell, and having an output;
   a second AND gate, having a first input for receiving data on the first input of the cell and a second input for receiving data on the third input of the cell, said second AND gate having an output corresponding to the first output of the cell; and
   an OR gate, having a first input coupled to the output of the first and gate, and a second input for receiving the data on the second input of the cell, said OR gate having an output corresponding to the second output of the cell.

4. The apparatus of claim 2, wherein the first input of a given computational cell is labeled A, the second input is labeled P, the third input is labeled I, the first output is labeled N, and the second output is labeled O, and further wherein each computational cell produces a logic value at its first output N based on the logic equation, $$N = A \text{ AND } I$$

and wherein each cell produces a logic value at its second output O based on the logic equation, $$O = P \text{ OR } (\text{NOT } A \text{ AND } I).$$

5. The apparatus of claim 2, wherein a plurality of computational cells are arranged in a cascaded order so as to define $0^{th}$ to $N^{th}$ computational cells such that the second output from an $i^{th}$ computational cell is coupled to the third input of an ($i^{th}$+1) computational cell, and the second output from the $N^{th}$ computational cell is coupled to the third input of the $0^{th}$ computational cell.

6. The apparatus of claim 1, wherein the array of buffers comprises N buffers and data received at the first input of each computational cell collectively comprise an availability vector comprising N bits, each bit corresponding to an availability status of a respective buffer.

7. The apparatus of claim 1, wherein the array of buffers comprises N buffers and the next available buffer vector comprises N bits, each bit corresponding to a respective buffer, said next available buffer vector including only one bit that is asserted, said asserted bit identifying the next available buffer to be allocated.

8. A processor comprising:

an array of buffers;

an array of computational cells coupled to one another in a cascaded fashion, each computational cell corresponding to a respective buffer in the array of buffers and including:

a first input for receiving data corresponding to an availability status of a buffer corresponding to the computational cell;

a second input for receiving data corresponding to a currently selected buffer from among the array of buffers;

a first output upon which data is produced for identifying a next available buffer, a second output; and a third input, coupled to the second output of a preceding computational cell, wherein the first output is coupled to logically AND the first input with the third input, and wherein the data produced on the first outputs of the computational cells collectively comprise a next available buffer vector that identifies the next buffer in the buffer array to be allocated for use.

9. The processor of claim 8, wherein said array of computational cells define $0^{th}$ to $N^{th}$ computational cells, and the second output from the $N^{th}$ computational cell is coupled to the third input of the $0^{th}$ computational cell.

10. The apparatus of claim 9, wherein the array of buffers comprises N buffers and data received at the second input of each computational cell collectively comprise a current selected entry vector comprising N bits, each bit corresponding to a respective buffer, said current selected entry vector including only one bit that is asserted, said asserted bit identifying a most recently allocated buffer.

11. The processor of claim 8, wherein each computational cell comprises:

an inverter for receiving data on the first input of the cell and having an output;

a first AND gate having a first input coupled to the output of the inverter; and a second input for receiving data on the third input of the cell, and having an output;

a second AND gate, having a first input for receiving data on the first input of the cell and a second input for receiving data on the third input of the cell, said second AND gate having an output corresponding to the first output of the cell; and an OR gate, having a first input coupled to the output of the first and gate, and a second input for receiving the data on the second input of the cell, said OR gate having an output corresponding to the second output of the cell.

12. The processor of claim 8, wherein the first input of a given computational cell is labeled A, the second input is labeled P, the third input is labeled I, the first output is labeled N, and the second output is labeled 0, and further wherein each computational cell produces a logic value at its first output N based on the logic equation, $$N = A \text{ AND } I$$

and wherein each cell produces a logic value at its second output O based on the logic equation, $$O = P \text{ OR } (\text{NOT } A \text{ AND } I).$$

13. A method comprising:

determining an availability vector A(x) that corresponding to an availability status of each buffer in an array of buffers;

determining a current selected entry vector P(x) that identifies a most recently allocated buffer; and determining a next available buffer vector N(x) that identifies the next available buffer to be allocated from among the plurality of buffers by determining the following logical relations:

$$N(x) = A(x) \text{ AND } I(x).$$

$$O(x) = P(x) \text{ OR } [(\text{NOT } A(x)) \text{ AND } I(x)],$$

and $$I(x) = O(x-1).$$

14. The method of claim 13, wherein the array of buffers comprises n buffers and the availability vector A(x) comprises n bits, each bit corresponding to an availability status of a respective buffer.

15. The method of claim 13, wherein the array of buffers comprises n buffers and the current selected entry vector P(x) comprises n bits, each bit corresponding to a respective buffer, said current selected entry vector P(x) including only one bit that is asserted, said asserted bit identifying a most recently allocated butter.

16. The method of claim 13, wherein the array of buffers comprises n buffers and the next available buffer vector N(x) comprises n bits, each bit corresponding to a respective buffer, said next available buffer vector N(x) including only one bit that is asserted, said asserted bit identifying a next available buffer to be allocated.

* * * * *

UNITED STATES PATENT AND TRADEMARK OFFICE
CERTIFICATE OF CORRECTION

PATENT NO. : 6,895,495 B1
DATED : May 17, 2005
INVENTOR(S) : Holscher

It is certified that error appears in the above-identified patent and that said Letters Patent is hereby corrected as shown below:

Column 4,
Line 22, delete "the," and insert -- the --.

Signed and Sealed this

Twelfth Day of July, 2005

JON W. DUDAS
*Director of the United States Patent and Trademark Office*